June 2, 1931.  P. STAUFFER  1,808,382
COUPLING FOR HOSE, PIPE, OR OTHER CONDUCTORS
Filed June 7, 1928
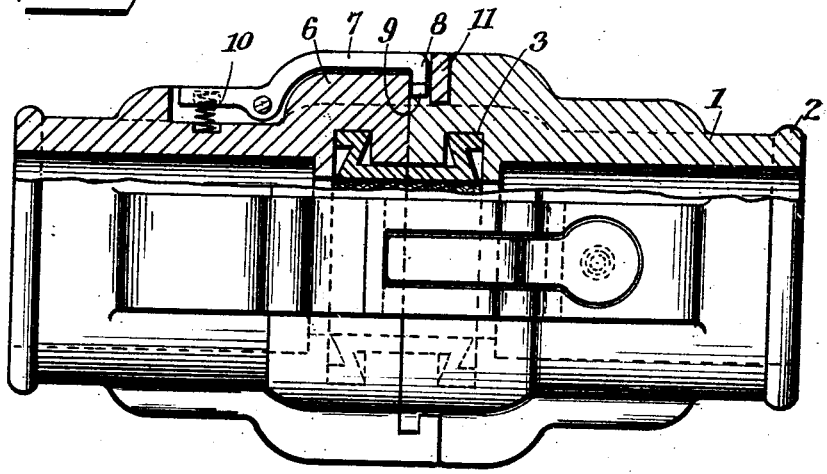
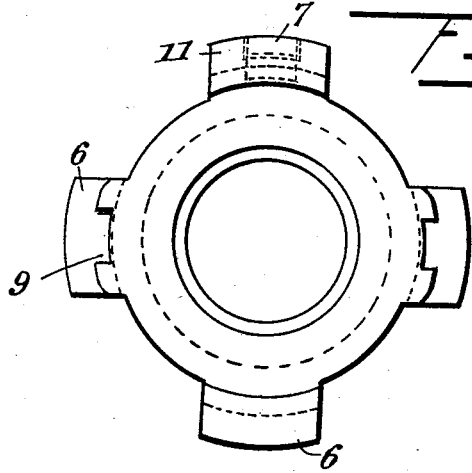
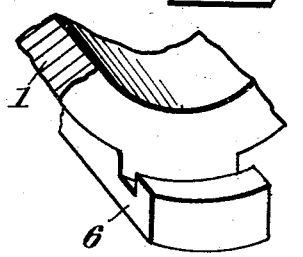
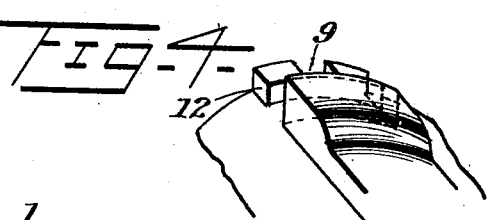
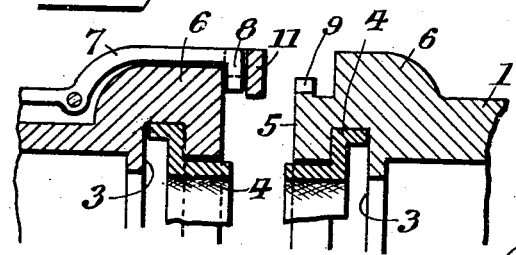
INVENTOR.
Paul Stauffer
BY
Jacobi & Jacobi
ATTORNEYS.

Patented June 2, 1931

1,808,382

UNITED STATES PATENT OFFICE

PAUL STAUFFER, OF CLEARFIELD, PENNSYLVANIA

COUPLING FOR HOSE, PIPE, OR OTHER CONDUCTORS

Application filed June 7, 1928. Serial No. 283,530.

This invention relates to a coupling adapted to be used for hose, pipe or any other conductor and it consists in the novel features hereinafter described and claimed.

An object of the invention is to provide a coupling structure consisting of two members which are identically alike and having means for effectually inter-engaging each other, whereby a tight joint is effected at the coupling and the pipe line may be used for conducting air, gas, water, steam or other fluid, and the joint remains tight and secure, irrespective of the direction in which the fluid passes through the coupling.

A further object of the invention is to provide a device of the character stated which is especially adapted to be used for coupling fire hose and by giving the coupling members a quarter turn with relation to each other, they are caused to effectually engage each other and a seal is provided at the edges of the said coupling members whereby the escape of the liquid or fluid is prevented at the joint.

A further object if the invention is to provide upon coupling members of the character stated interlocking or inter-engaging means for holding the members in close contact with each other. The said locking means are so arranged and disposed that both of them must be actuated simultaneously in order to release the coupling members from each other or to engage them with each other.

In the accompanying drawings:

Figure 1 is a side elevational view of the coupling, with parts broken away and parts shown in longitudinal section.

Figure 2 is an end elevational view of one of the coupling members.

Figure 3 is a fragmentary perspective view of an end portion of one of the coupling members.

Figure 4 is a perspective view of another end portion of one of the coupling members.

Figure 5 is a fragmentary longitudinal sectional view of the coupling members of the device, showing the same detached from each other.

As both of the coupling members are identically alike the description of one will answer for both. Each coupling member includes a sleeve 1 provided at its end with an annular bead 2 located either on the inside or outside to which a section of hose (not shown) may be engaged or threaded as desired. Each coupling member is provided at its opposite end and located interiorly thereof with an annular recess 3 adapted to receive the inner portion of a rubber valve 4. The valve 4 is cylindrical in transverse section and is provided with offset end portions which are normally parallel with relation to each other. One end portion of the valve 4 normally projects beyond the end portion of the coupling member and said end portion is smooth forming a face 5. The face of one coupling member is adapted to abut against the other face of the other coupling member when the parts are assembled.

Each of the sleeve members is provided at its exterior surface with a series of longitudinally disposed lugs 6 the said lugs being located quadrally around the periphery of the sleeve and spaced from each other at equal distances. One of the lugs 6 of each member is provided with a pivoted latch 7 having an angularly disposed end 8 adapted to engage in one of the recesses 9 provided in one of the lugs 7 of the other sleeve member. A spring 10 is housed under the outer portion of the latch member 7 and bears against the inner surface thereof whereby the end portion 8 of the latch member is held in the recess 9 of the adjacent member when the parts are coupled together. The lug 6 which carries the latch member 7 is provided at its end with a flange 11 adapted to engage behind an upstanding flange 12 whereby the members are secured together.

When the flange 11 is engaged behind the flange 12, by giving the members a quarter turn with relation to each other, the end portion 8 rides up over the upper edge of the flange 12 and when the end portion 8 comes into register with the recess 9, the spring 10 swings the latch member 7 whereby the end portion 8 is forced down into the recess 9 and the coupling members are locked together. When the faces 5 of the coupling members are brought together the edges of the valves 4 come into contact with each other and the said edges are compressed and assume the position as shown in Figure 1 of the drawing, and whereby the joint between the coupling members is effectually closed. When fluid passes through the coupling member pressure is exerted upon the inner surfaces of the valves and the end portions of the valves are forced outwardly against the inner side of the coupling members and, consequently, the joint thus made is effectually sealed. As each coupling member is provided with an interiorly located annular recess 3 receiving the inner portion of a valve 4, the valve is so formed as to fit neatly in the annular recess at the bottom of the recess because of the small projection at the inner end of the valve, whereby a recess is left from the top of this projection on the valve to the end of the recess 3. This recess is there for two reasons. First when water or whatever is being conducted through the conductor naturally has outward pressure and pushes outward on the small projection and helps to seal the valve at the bottom so that the water cannot get back of the valve. Second when the two members of the coupling are connected together, the valve formed as it is with the small projection at the end holds the valve firmly when it is compressed at the face of the joint and pushed back at the top and side of the recess 3, thereby making a spring of the valve on account of it being tight at one end in the recess and thus producing an effective seal, which is sufficient to stop any leak until pressure is applied. Third, the recess or the side of the recess from the projection is left for the purpose of further tightening the valve at the face of the joint. This is brought about by the water getting in the recess back of the valve from the top of the projection of the valve into the annular recess 3 and when the pressure comes on, it forces the valve forward in one member of the coupling and in the opposite member, forces the valve backward, thereby causing the valves to push tighter together at the face of the joint and the stronger the pressure the tighter they are sealed. When the members are pushed together it forces the valve of each member back at the top of the annular recess, but not far enough to close the recess at the top as enough space is allowed for water or whatever is to be conducted to get in the recess at the top of the valve to permit the forming of the pressure desired and because they are formed as shown and described, the action of the valves is automatic. The action of the valves when under pressure is best shown in Figure 1 of the drawings. Furthermore, it will be observed that the structure is such that the coupling is automatically sealed tightly without requiring use of a wrench.

It is, of course, to be understood that the latch member 7 upon one of the coupling members does not align with the latch member 7 upon the other coupling member when the parts are being brought together and are connected with each other as hereinbefore described. The said latch members are positioned one at one side of the coupling member and another at another side of the coupling and when the members are given a quarter turn with relation to each other, the said latch members engage the flanges and the members are securely held together.

When it is desired to disconnect or uncouple the members from each other, both of the latch members 7 are depressed so that their ends 8 are moved out of the recesses 9 and consequently, the coupling members may be turned with relation to each other and the flanges are disengaged from each other.

It will be noted that the valve is so fitted into the coupling member that it does not project out into the main area of the conductor. This is done to avoid friction. The recess back of the valve is there to make use of the pressure in the conductor but does not interfere in any way with the flow in the conductor. The projection at the end of the valve in the recess is there to assist in forming the spring in the valve when first connected and to stop any leak getting in back of the valve. This is brought about when the valves are pushed together as it tightens the valve in the recess and when the pressure takes effect it pushes the projecting portions of the valves tightly against the walls of the recess and further tightens the seal while the pressure is on. The valves cannot buckle when the pressure is on as the outward pressure keeps them tight against the inner walls of the coupling members and prevents buckling. The valves, being shaped as they are, may be very readily inserted or taken out and do not require any expansion ring or anything else to hold them in place because the inserted ends are larger than the openings of the coupling members, and furthermore, when the pressure is on, it is extended outwardly, and this is bound to hold the inserted ends in the annular recess 3 tightly and against the outer walls thereof.

The valves are also protected against damage as there is only a small fraction of an inch extending beyond the faces of the couplings and these projecting portions are protected in a great measure by the lugs 6 as they extend beyond the ends of the valves.

The coupling is devoid of projections upon its outer side which would interfere when being dragged through a hole, over ledges or upon the ground. The members can be quickly coupled or uncoupled and by reason of the fact that the ends thereof are symmetrical, it is not necessary to pick out certain ends to couple as it is necessary today where male and female couplings are used. On account of the fact that the valves work automatically in making the coupling and by being tightened by the pressure, gives the structure great advantages and improvements. When the coupling members are disconnected from each other, there are no loose parts to be lost and thereby cause inconvenience or delay. As the interlocking devices are upon the outer side of the coupling members, they are easy to get at and any accumulation of dirt or ice may be easily and quickly removed, making it certain that the coupling members may be connected together under difficulties. The longitudinal rises upon the outer side of the coupling members make the members stronger and reenforces the members, thus preventing the coupling members from getting out of true circles. The latches are so constructed that they are easy of access and countersunk so that they will not be easily broken and it is practically impossible to unlock them unless they are released by hand, and furthermore, both of the latches must be pressed at the same time.

From the foregoing description of the construction of my improved apparatus, it will be seen that I have provided a simple, inexpensive and efficient means for carrying out the objects of my invention and while I have particularly described the elements best adapted to perform the functions set forth, it is obvious that various changes in form, proportion and in the minor details of construction may be resorted to without departing from the spirit or sacrificing any of the principles of the invention.

Having thus described the invention, what is claimed is:

1. In a coupling, a pair of complementary identical coupling members, each being provided with an annular recess in the inner face thereof adjacent its free end, a flexible valve forming ring for disposition against the inner surface of each coupling member adjacent the outer end, an outwardly extending flange formed on the inner edge portion of each ring like member for disposition within the respective recess and normally abutting against one side of the said recess, the outer edge portion of each ring-like member projecting beyond the adjacent end of the respective coupling member, and a laterally disposed extension formed on the outer edge of the flange for engagement with the inner wall of the respective recess, the inner opposed edges of the ring-like members being disposed in abutting relation, the flange portion being shifted to a position diagonally within the respective recesses and bearing against the inner wall of the recess when the coupling members are secured together, as and for the purposes described.

2. In a coupling of the class described, a pair of complementary identical coupling members, each formed with an internal annular recess adjacent its free and abutting end and an annular flange constituting an extension of the inner side wall of the recess, a flexible valve forming ring applied in the abutting end of each member having one end extending slightly beyond the free end of said member and the other end provided with an angular extension fitting in the adjacent recess thereof, the projecting portions of said rings contacting and compressing the rings to distort the extensions thereof in the respective recesses and move the extensions into a position to bear against the flanges of the members and seal the recesses when the coupling members are abutted, and means for releasably securing said coupling members together.

3. In a coupling of the class described, a pair of complementary identical coupling members, each formed with an internal annular recess adjacent its free and abutting end and with an internal annular flange flush with the inner wall of the recess, a flexible valve forming ring disposed in the abutting end of each member having the outer end portions thereof slightly extended beyond the outer ends of the respective members, angular flanges formed on the opposite ends of the ring members and fitted in the adjacent annular recesses of the respective members and terminating in annular lips bearing against the inner walls of the recesses, the projecting ends of said ring members being adapted for contact to compress said ring members and distort the flanges thereof for bearing against the annular flanges of the members and sealing the recesses of the respective members when the coupling members are brought in abutting relation and means for releasably securing said coupling members in abutting and sealing relation.

4. In a coupling of the class described, a pair of complementary coupling members each provided adjacent its free and abutting end with a plurality of external longitudinally extending and spaced apart lugs, the lugs of one of said members being provided with transverse recesses, one of the lugs on the other of said members being provided with a longitudinal recess having its rear portion of greater depth than its forward portion, a pivoted spring forced latch disposed within the last mentioned longitudinal recess having its forward portion normally resting upon the bottom of the recess projecting beyond the abutting end of the member carrying the same and formed with a bill adapted to be received in locking engagement with one of the transverse recesses of the opposed member when said members are brought in abutting relation, the rear portion of the latch being of less depth than the rear portion of the recess and normally spaced from the bottom thereof, the lugs of said opposed members being adapted for longitudinal alignment to simultaneously protect the body of the coupling and the interlocking elements thereof.

In testimony whereof I affix my signature.

PAUL STAUFFER.